US010479540B2

(12) United States Patent
Cullen

(10) Patent No.: US 10,479,540 B2
(45) Date of Patent: Nov. 19, 2019

(54) ADJUSTABLE BAGGING TUNNEL

(71) Applicant: SRC Innovations LLC, Chinook, WA (US)

(72) Inventor: Steven R. Cullen, Chinook, WA (US)

(73) Assignee: SRC Innovations, LLC, Chinook, WA (US)

(*) Notice: Subject to any disclaimer, the term of this patent is extended or adjusted under 35 U.S.C. 154(b) by 452 days.

(21) Appl. No.: 15/112,783

(22) PCT Filed: Feb. 10, 2015

(86) PCT No.: PCT/US2015/015250
§ 371 (c)(1),
(2) Date: Jul. 20, 2016

(87) PCT Pub. No.: WO2015/120469
PCT Pub. Date: Aug. 13, 2015

(65) Prior Publication Data
US 2016/0332760 A1 Nov. 17, 2016

Related U.S. Application Data

(60) Provisional application No. 61/937,934, filed on Feb. 10, 2014, provisional application No. 61/937,931, filed on Feb. 10, 2014.

(51) Int. Cl.
*B65B 39/02* (2006.01)
*A01F 25/14* (2006.01)
(Continued)

(52) U.S. Cl.
CPC .............. *B65B 39/02* (2013.01); *A01F 25/14* (2013.01); *B65B 1/04* (2013.01); *B65B 39/007* (2013.01);
(Continued)

(58) Field of Classification Search
CPC ........... B65B 39/02; B65B 43/42; B65B 1/04; B65B 39/007; A01F 25/14; A01F 2025/145; A01F 2025/142
(Continued)

(56) References Cited

U.S. PATENT DOCUMENTS 1,491,428 A * 4/1924 Starmer ................. A44B 11/28
24/320
2,429,926 A * 10/1947 Davis ................... A44B 11/125
24/197
(Continued)

FOREIGN PATENT DOCUMENTS

WO WO 2006/069227 A2 6/2006

OTHER PUBLICATIONS

Supplementary European Search Report for EP Application No. 15746408.2, dated Jul. 4, 2017 (3 pages).

*Primary Examiner* — Alexander M Valvis
*Assistant Examiner* — Katie L Gerth
(74) *Attorney, Agent, or Firm* — Brinks Gilson & Lione; Ryan L. Marshall; Jonathan Hartley

(57) ABSTRACT

An adjustable tunnel for a bagging machine that enables a variety of bag sizes to be fitted to the tunnel is disclosed. The adjustable tunnel has a height adjustable overhead panel, an adjustable width base, a first and second side panel, a first and as second intermediate panel, and a surface tensioning assembly.

17 Claims, 9 Drawing Sheets

(51) Int. Cl.
*B65B 1/04* (2006.01)
*B65B 39/00* (2006.01)
*B65B 43/42* (2006.01)

(52) U.S. Cl.
CPC ........ *B65B 43/42* (2013.01); *A01F 2025/145* (2013.01)

(58) Field of Classification Search
USPC ............ 410/132, 114–115, 105–112; 53/459
See application file for complete search history.

(56) References Cited

U.S. PATENT DOCUMENTS

| | | | | |
|---|---|---|---|---|
| 4,611,642 A * | 9/1986 | Durhman | ................ | A01F 25/14 141/114 |
| 4,653,553 A * | 3/1987 | Cox | ........................ | A01F 25/14 100/191 |
| 4,724,876 A * | 2/1988 | Ryan | ........................ | A01F 25/14 100/144 |
| 4,735,242 A * | 4/1988 | St. Clair | ................ | A01F 25/14 141/10 |
| 5,140,802 A * | 8/1992 | Inman | ..................... | A01F 25/14 141/114 |
| 5,419,102 A * | 5/1995 | Inman | ..................... | A01F 25/14 53/257 |
| 5,421,142 A * | 6/1995 | Cullen | .................... | A01F 25/14 100/100 |
| 5,464,049 A * | 11/1995 | Cullen | .................... | A01F 25/14 141/114 |
| 5,566,532 A * | 10/1996 | Inman | ..................... | A01F 25/14 100/100 |
| 5,724,793 A * | 3/1998 | Inman | ..................... | A01F 25/14 53/258 |
| 5,878,552 A * | 3/1999 | Wingert | .................. | A01F 25/14 53/438 |
| 6,220,001 B1 * | 4/2001 | Brodrecht | ............... | A01F 25/14 53/556 |
| 6,672,034 B1 * | 1/2004 | Wingert | .................. | A01F 25/14 53/436 |
| 6,907,714 B2 * | 6/2005 | Cullen | .................... | A01F 25/14 53/530 |
| 8,065,859 B1 * | 11/2011 | Wingert | ................ | A01F 25/183 100/191 |
| 2005/0155332 A1 * | 7/2005 | Cullen | .................... | A01F 25/14 53/530 |
| 2006/0096253 A1 * | 5/2006 | Cullen | .................... | A01F 25/14 53/459 |
| 2007/0084153 A1 * | 4/2007 | Cullen | .................... | A01F 25/14 53/527 |
| 2009/0241488 A1 | 10/2009 | Cullen | | |
| 2010/0064641 A1 * | 3/2010 | Cullen | .................... | A01F 25/14 53/570 |
| 2011/0162328 A1 * | 7/2011 | Cullen | .................. | A01D 87/02 53/459 |

\* cited by examiner

ADJUSTABLE BAGGING TUNNEL

REFERENCE TO EARLIER FILED APPLICATIONS

The present application is a 371 of PCT/2015/015250, filed Feb. 10, 2015, which claims the benefit to U.S. Provisional Patent Application No. 61/937,931, filed Feb. 10, 2014, and titled "ADJUSTABLE BAGGING TUNNEL," and U.S. Provisional Patent Application No. 61/937,934, filed Feb. 10, 2014, and titled "BAG LOADING SYSTEM." All of the foregoing applications are hereby incorporated by reference in their entirety.

BACKGROUND

1. Technical Field

The present disclosure relates to bagging systems and methods for bagging materials such as organic materials, silage, compost, grain, sawdust, dirt, sand, and other compactable materials.

2. Background Information

Agricultural feed bagging machines have been employed for several years to pack or bag silage and the like into elongated bags. In recent years, the bagging machines have also been used to pack or bag compost material and other materials into the elongated plastic bags. Two of the earliest bagging machines are disclosed in U.S. Pat. Nos. 3,687,061 and 4,046,068, the complete disclosures of which are incorporated herein by reference for all purposes. In these bagging machines, material is supplied to the forward or intake end of the bagging machine and is fed to a rotor. The rotor conveys and compresses the material into a tunnel onto which the bag is positioned, thereby filling the bag. The bagging machine moves forward at a controlled rate leaving the packed bag behind. The packing density of the material packed in the bag is determined and controlled by a number of factors including the rate at which the bagging machine moves forward and the rate at which the material is packed into the bag.

Over the past several years, bagging machines and their associated systems, methods, and components have developed to accommodate a variety of needs. For example, bagging machines and their tunnels have dramatically increased in size to accommodate end-users' desire to use larger bags. Tunnels for use with the bagging machines are available in a variety of widths, some of which are sufficiently large to accommodate bags having a 12-foot diameter. The large width of the tunnel presents a problem when the bagging machine is being transported on public roads, which normally limit widths to approximately 102 to 118 inches (2.5 to 3 meters) in the United States, European countries, and other parts of the world. Such width restrictions greatly reduce the mobility of machines with larger tunnels. The large width of the tunnel also presents a problem when the machines and tunnels are being shipped, especially overseas.

Another drawback with many conventional bagging machines is that they can only be used with bags of a single width. That is, conventional bagging machines can be used with bags of varying length, sometimes up to several hundred feet long. However, a bagging machine and associated tunnel typically can only be used with bags of a single width, such as 8 feet, 10 feet, 12 feet, 14 feet, or other predetermined width.

Bagging machines, whether used to bag feed, compost, or other material, can be used in a variety of circumstances and to serve multiple end-users. A particular farm may need to bag different types of silage in different size bags. The same farming operation may also desire to compost material in yet another size bag. Using conventional bagging technology, a separate machine, or at least separate tunnels, would be required for each such use, the cost of which may be prohibitive.

There remains, therefore, a need to provide systems and methods that address these many needs in the bagging industry.

BRIEF SUMMARY

In one aspect, an adjustable tunnel of a mobile bagging machine is disclosed. In some embodiments, the tunnel includes an expandable base having first and second ends, the expandable base having collapsed and expanded configurations, wherein a distance between the first end and the second end is less in the collapsed configuration than in the expanded configuration. In some embodiments, the tunnel also includes a central arch panel disposed above the expandable base, wherein the central arch panel is vertically movable between first and second positions. In some embodiments, the tunnel also includes a first side panel having a first side panel base coupled to the expandable base at the first end; a second side panel having a second side panel base coupled to the expandable base at the second end; a first intermediate panel disposed between the central arch panel and the first side panel; a second intermediate panel assembly disposed between the central arch panel and the second panel. In some embodiments, the tunnel also includes a surface tensioning assembly disposed about the first and second side panels, the first and second intermediate panel, and the central arch panel.

In some embodiments, the adjustable tunnel also includes an expandable inlet assembly having a lower portion coupled to the expandable base and an upper portion coupled to the central arch panel, the expandable inlet assembly having first and second configurations, wherein a height of the expandable inlet assembly varies between the first and second configurations.

In some embodiments, the adjustable tunnel also includes an end panel assembly having a lower end panel coupled to the lower portion of the inlet assembly and an upper end panel connected the upper portion of the expandable inlet assembly, wherein the lower end panel and the upper end panel are vertically movable relative to one another.

In some embodiments, the lower end panel couples to the lower portion of the expandable inlet through a first vertical hinge and the upper end panel couples to the upper portion of the expandable inlet through a second vertical hinge, wherein the first vertical hinge and the second vertical hinge have non-collinear axes.

In some embodiments, the surface tensioning system includes at least one strap coupled to the first side panel at a first strap end and to the second side panel at a second strap end. In some embodiments, the strap has a fixed length and each side panel has a plurality of mounts.

In some embodiments, the adjustable tunnel is characterized in that the expandable base includes a fixed center portion and a first extendable beam extending from the fixed center portion to the first end and a second extendable beam extending from the center portion to the second end.

In some embodiments, the mounts are spaced apart at a fixed interval. In some embodiments, the plurality of mounting positions consists of two pins. In some embodiments, the strap has a looped end, and each of the mounts includes a pin. In some embodiments, the strap selectively mounts in at least three configurations consisting of the loop about the first pin, the strap under the first pin and the loop about the second pin, and the strap under the first pin, the strap looping around the second pin, and the loop about the first pin.

In some embodiments, the tunnel includes an expandable-base-stop having a plurality of discrete stop positions. In some embodiments, the tunnel includes a graduated stop mechanism having a plurality of discrete positions for the height of the expandable inlet.

In some embodiments, the number of plurality of mounting positions of the strap, the number of the plurality of the discrete stop position, and the number of the discrete positions of the height are each equal in quantity to one another. In some embodiments, the number of plurality of mounting positions of the strap is three, the number of the plurality of the discrete stop positions is three, and the number of the discrete positions of the height is three.

In some embodiments, the tunnel also includes a bag hoisting assembly configured to lift a portion of a bag over the central arch panel. In some embodiments, the bag hoisting assembly includes a beam over the central arch panel and a longitudinally movable hoist coupled to the beam. In some embodiments, the bag hoisting assembly includes a beam assembly disposed above the expandable base, the beam assembly having an axis of rotation about a base end of the beam and a trolley assembly configured to translate along the beam assembly. In some embodiments, the beam assembly axis of rotation is coupled to the upper portion of the inlet.

In some embodiments, the tunnel also includes (i) a basket assembly having a first beam proximate the first side panel and a second beam proximate the second side panel, (ii) a trolley assembly having a first trolley disposed on the first beam and a second trolley disposed on the second beam wherein the basket assembly is coupled to the first and second trolleys.

In another aspect, a mobile bagging machine is disclosed. The machine includes a chassis, a feed bin coupled to the chassis, a packing assembly coupled to the feed bin, an adjustable tunnel coupled to the packing assembly, and an extendable cabin coupled to the chassis.

In some embodiments, the adjustable tunnel of the machine includes the components already summarized above.

In another aspect, a mobile bagging system is disclosed. The mobile bagging system includes a bagging tunnel having an inlet and an outlet; a rail assembly disposed above the bagging tunnel and extending from above the inlet toward the outlet, the rail assembly having a horizontal axis of rotation proximate the inlet; and a cross-member assembly slidably mounted to the rail assembly, the cross member assembly having a bag retainer disposed thereon adapted to hold a bag.

In some embodiments, the rail assembly includes a first rail disposed proximate a first side of the bagging tunnel and a second rail disposed proximate a second side of the bagging tunnel and the cross-member extends between the first and second rails. In some embodiments, a first trolley is coupled to the first rail and a second trolley is coupled to the second rail, the first and second trolleys slide along the first and second rails, and the cross-member is slidably mounted to the first and second rails through the first and second trolleys.

In some embodiments, the bag retainer is disposed proximate a horizontal center of the cross member assembly.

In some embodiments the rail assembly rotates about the horizontal axis from a first position in which an end of the rail proximate the inlet is lower than an end of the rail proximate the outlet and a second position in which the end of the rail proximate the inlet is higher than the end of the rail proximate the outlet. In some embodiments, the rail end proximate the outlet is lower than the bagging tunnel in the second position. In some embodiments, the bagging tunnel has a horizontal inward taper from the inlet to the outlet and the first and second rails are angled outward from the inlet to the outlet.

In some embodiments, the axis of rotation is selectively moveable between a plurality of vertical heights of the tunnel. In some embodiments, the trolley is biased toward the outlet when the rail is in the first position and is biased toward the inlet when the rail assembly is in the second position.

In another aspect, a bagging machine is disclosed. The bagging machine includes a hopper configured to receive material, the hopper having an exit; a tunnel disposed proximate the exit of the hopper, the tunnel having an inlet and an outlet; a packing assembly disposed at the exit of the hopper and the tunnel inlet; a bag lifting system disposed above the tunnel, the bag lifting system comprising first and second rails extending longitudinally from proximate the hopper toward the tunnel outlet, the first and second rails having an axis of rotation proximate the hopper exit, and a basket coupled to the first and second rail, the basket configured to slidably move from a first position proximate the tunnel outlet and a second position proximate the tunnel inlet.

In some embodiments, the packing assembly further includes a rotor. In some embodiments the first and second rails have a first configuration in which the first and second rails slope upward from tunnel, and a second configuration in which the first and second rails slope downward from the tunnel.

In some embodiments, the bagging machine further includes first and second trolleys slidable coupled to first and second rails, wherein the basket is coupled to the first and second rails through the first and second trolleys.

In another aspect, a method of loading bag onto the mobile bagging machine is disclosed. The method includes obtaining a cylindrical bag; accessing a mobile bagging machine comprising a tunnel having an inlet and an outlet, with at least one rail extending from a first end proximate the inlet to a second end proximate the outlet, the at least one rail being rotatable about the first end, and a cross-member configured to slide along the at least one rail; expanding a mouth of the cylindrical bag; lowering the second end of a rail relative to the first end of the rail, causing the slidable cross member to slide toward the second rail end; fitting a top of the mouth of the cylindrical bag over the slidable cross member; securing the cylindrical bag to the top of the slidable cross member; raising the second end of the rail above the first end of the rail causing the slidable cross member to slide toward the first end of the rail pulling the cylindrical bag along with the slidable cross member; and advancing a bottom of the mouth of the cylindrical bag toward the first end of the rail.

In some embodiments, lowering the rail at a downward angle includes rotating the rail about an axis in a first direction proximate the first rail end and raising the rail to an upward angle comprises rotating the rail about the axis in a second direction opposite the first direction.

In some embodiments, lowering the rail at a downward angle further includes lowering the axis proximate the first rail end and raising the rail further includes raising the axis proximate the first rail end.

In some embodiments, the method further includes lowering the second end of the rails thereby sliding the cross-member towards the second rail end and after lowering the second end of the rail a second time, raising the second end of the rail higher than the first end of the rail causing the slidable cross member to slide toward the first end of the rail.

DETAILED DESCRIPTION

Figure 1:
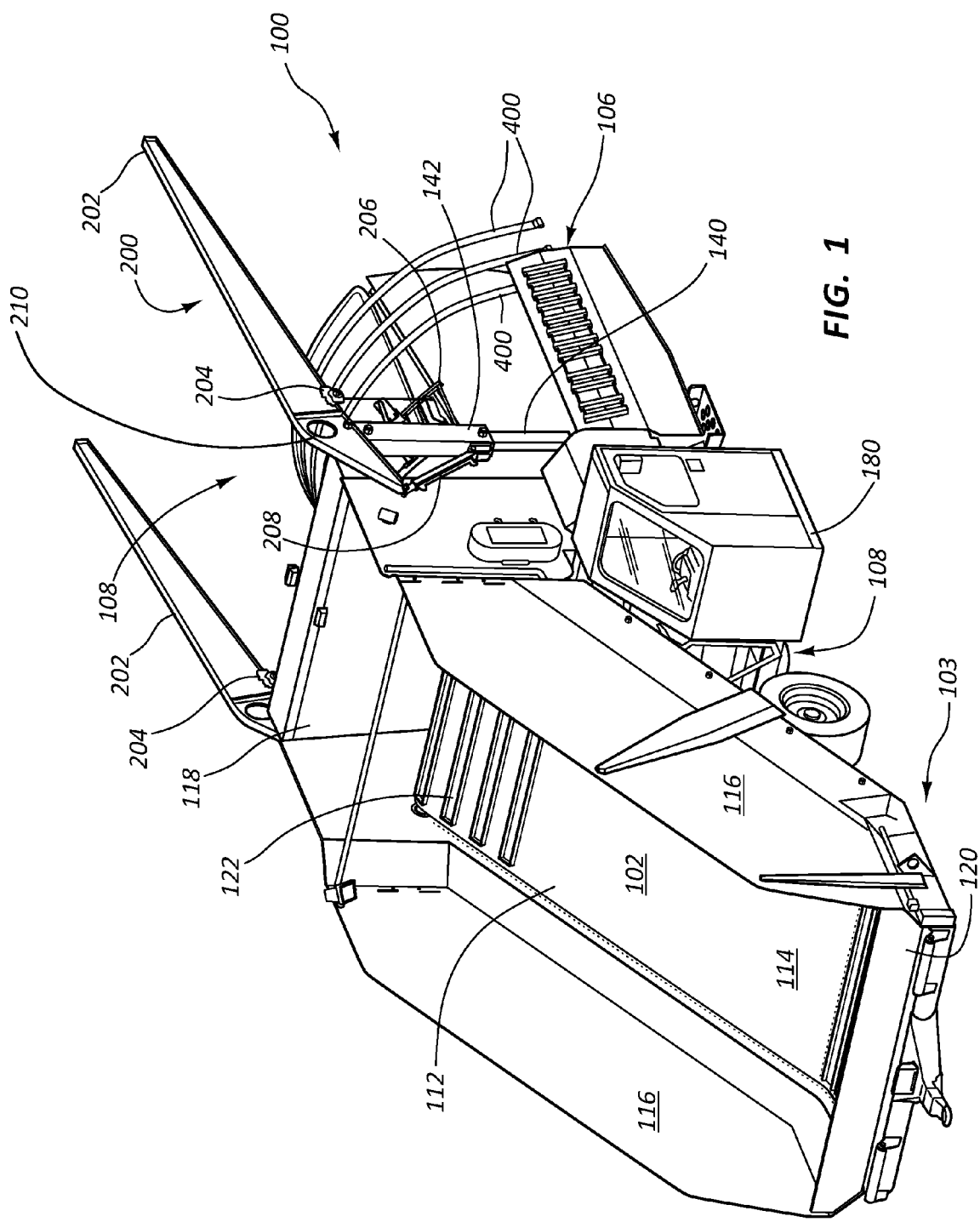
FIG. 1 illustrates the front of a mobile bagging machine for some embodiments.

The described embodiments of the present disclosure will be best understood by reference to the drawings, wherein like reference numbers indicate identical or functionally similar elements. It will be readily understood that the components of the present disclosure, as generally described and illustrated in the figures herein, could be arranged and designed in a wide variety of different configurations. Thus, the following more detailed description, as represented in the figures, is not intended to limit the scope of the invention as claimed, but is representative of some embodiments disclosed herein.

FIGS. 1-4 illustrate an embodiment of a mobile bagging machine 100. In the description that follows, reference will be made to front and rear of the mobile bagging machine 100. The rear of the mobile bagging machine 100 is hereby defined as the end of the mobile bagging machine to which a bag may be fitted and is shown by arrow 101 in FIG. 2. In the description, reference may be made to a rearward direction. A rearward direction is one that is generally towards the area past the rear of the mobile bagging machine 100. The front of the mobile bagging machine 100 is hereby defined as the end of the mobile bagging machine 100 opposite the rear and is designated by arrow 103 in FIG. 1. A forward direction is one that is generally toward an area past the front of the mobile bagging machine 100.

The mobile bagging machine 100 is includes a feed bin 102, a packing assembly 104, a tunnel assembly 106, and a chassis 108. In operation, material to be bagged is loaded into the feed bin 102. Throughout this application, the material being bagged will be referred to generally as silage, but silage is representative of any bulk material that could be packed in a bag. The feed bin 102 feeds the silage into the packing assembly 104 which packs the silage into a tunnel 110 of the tunnel assembly 106. A bag (not shown) is fitted about the tunnel assembly 106 and receives the packed silage. The bag may expand rearward as the silage is fed into it. The chassis 108 mounts the feed bin 102, packing assembly 104, and tunnel assembly 106, enabling them to be moved as a single unit. During the packing of silage into the tunnel 110, the chassis 108 moves forward at a desired rate thereby controlling the density of the packed silage. As the chassis 108 moves forward, the end of the bag remains in place, expanding the bag longitudinally.

The feed bin 102 is configured to receive silage and may store silage prior to feeding it into the packing assembly 104. The feed bin 102 has a hopper 112 defined by a floor 114, opposing side walls 116, a bulkhead 118, and a gate 120. The floor 114 may have a conveyer belt 122 disposed thereon for conveying silage from the front of the hopper 112 toward the bulkhead 118. Other configurations are possible and this is merely an exemplary embodiment. For example, the feed bin 102 could have an auger in place of the conveyer belt or silage could be fed directly into a gravity feed system.

The packing assembly 104 is disposed at the bulkhead 118 of the feed bin 102 and includes a rotor 124 (not visible, located behind comb 128) having a plurality of teeth 126 and a comb 128 having teeth 130 spaced apart by at least a width 132 of a tooth 126. A torque source, such as a motor, engine, or external rotation provides torque to rotate the rotor 124. As the rotor 124 rotates, the plurality of teeth 126 engage silage in the hopper 112 and push or drag the silage through the bulkhead 118 into the tunnel 110. The rotor 124 continues to rotate with the plurality of teeth 126 passing from the tunnel 110 into the hopper 112 through the comb 128. Any silage caught in the plurality of teeth 126 is removed by the comb 128 as the plurality of teeth 126 pass between the teeth 130 of the comb 128.

The tunnel assembly 106 provides a transition between the packing assembly 104 and a bag for receiving the packed silage. The tunnel assembly 106 has a cross section that is sized for a particular bag size. If the tunnel assembly 106 is too large, the bag will not fit over and around the tunnel assembly 106. If the tunnel assembly 106 is too small, there may be gaps between the tunnel assembly 106 and the bag allowing silage to escape and the bag to slip off of the tunnel assembly 106.

In one aspect, a system is disclosed enabling the tunnel assembly 106 to have a variable cross section. Having a variable cross section allows the tunnel assembly 106 to advantageously be used for different bag sizes without requiring different equipment. The tunnel assembly 106 may have discrete operating position for specific bag sizes, or in some embodiments, the tunnel assembly 106 may be continuously variable in cross section to fit a wide range of bag sizes. Additionally, the tunnel assembly 106 may be collapsed to a configuration with a small width facilitating highway travel.

A cabin 180 is disposed to the side of the chassis 108 and contains controls for operating the bagging machine 100. The cabin 180 is retractable so that it may be moved into and out of an opening in the chassis 108, such as a space below the feed bin 102. The cabin 180 may be retracted when the bagging machine 100 travels on a highway thereby keeping the width of the bagging machine 100 at a minimum acceptable width. When the bagging machine 100 is delivered to a worksite, the cabin 180 may be extended out from the chassis for operation. In situations where there is insufficient space to operate the bagging machine 100 with the cabin 180 extended, the bagging machine 100 may be operated with the cabin 180 in the retracted position, using for example, remote cameras and monitors.

Figure 3:
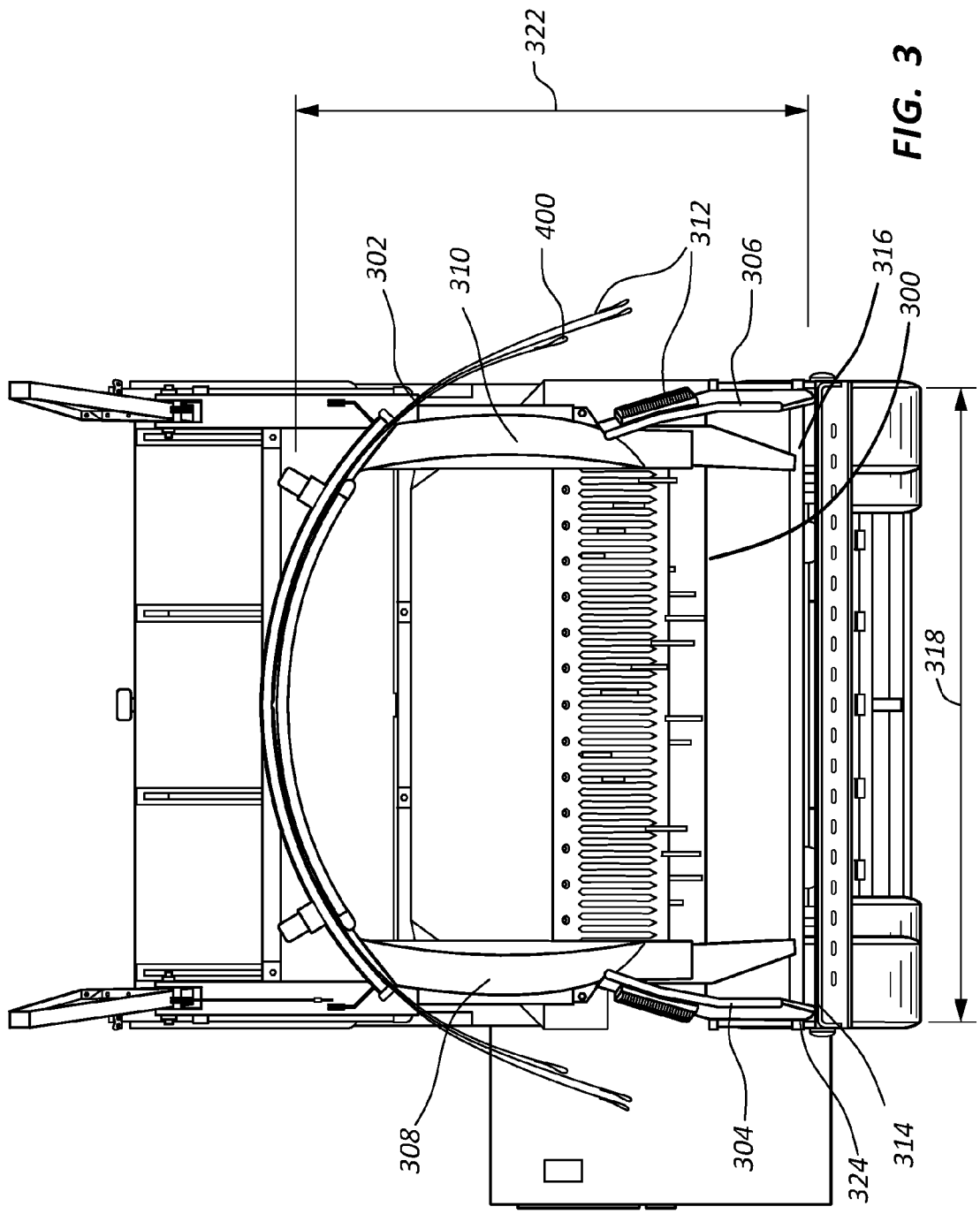
FIG. 3 illustrates another view of the rear of the mobile bagging machine of FIG. 1 showing an expandable base in a collapsed configuration.

FIG. 3 illustrates the rear of the mobile bagging machine 100 and the adjustable tunnel assembly 106 in a collapsed configuration. In some embodiments, the collapsed configuration of the tunnel assembly 106 is no wider than the feed bin 102. The mobile bagging machine 100 may, therefore, be transported on any road having a width of the feed bin 102.

Figure 4:
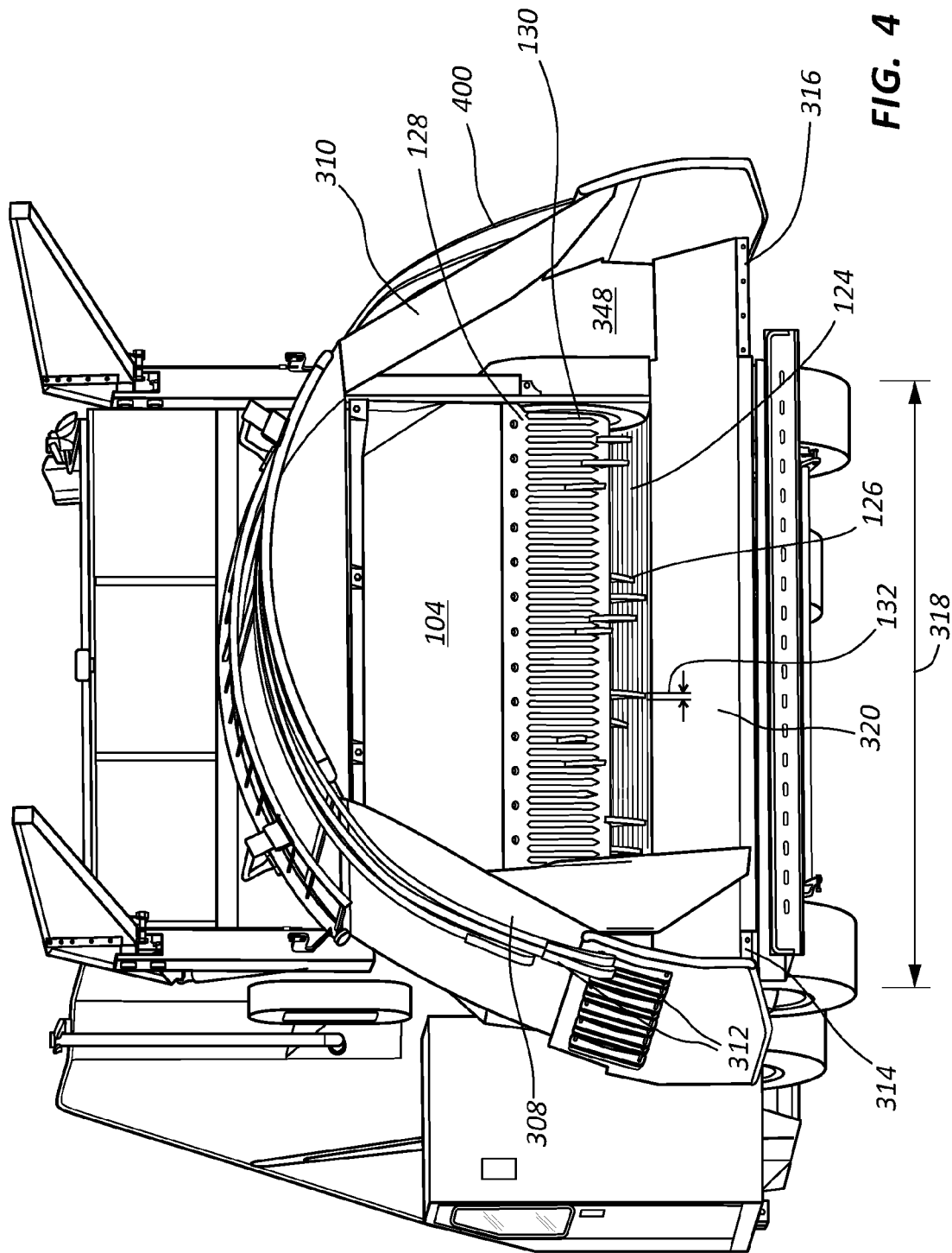
FIG. 4 illustrates another view of the rear of the mobile bagging machine of FIG. 1 showing the expandable base in an extended configuration.

FIG. 4 illustrates the rear of the mobile bagging machine 100 with the adjustable tunnel assembly 106 in an expanded configuration. In the expanded configuration the adjustable tunnel assembly 106 laterally extends beyond the width of the feed bin 106.

The adjustable tunnel assembly 106 will now be described further with reference to FIG. 3 and FIG. 4. The adjustable tunnel assembly 106 has an expandable base 300, a central arch panel 302, a first side panel 304, a second side panel 306, a first intermediate panel 308, a second intermediate panel 310, and a surface tensioning assembly 312. The bulkhead 118 may have a lower portion coupled to the expandable base 300 and an upper portion coupled to central arch panel 302. The bulkhead 118 forms an expandable inlet into the adjustable tunnel assembly 106.

The expandable base 300 has a first end 314 and a second end 316. The first end 314 and the second end 316 are movable relative to one another such that a distance 318 between the first end 314 and the second end 316 is variable. When the first end 314 and the second end 316 are at a minimum distance apart they are in a collapsed configuration as shown in FIG. 3. When the first end 314 and the second end 316 are at a greater distance apart, they are in an expanded configuration as shown in FIG. 4. The expandable base 300 may be adjustable to have configurations other than the collapsed configuration of FIG. 3 and the expanded configuration of FIG. 4, such that multiple widths are possible.

In the embodiment of FIGS. 1-4, the expandable base 300 is designed with four distinct configurations. The four distinct operating configurations may correspond to different configurations of the tunnel assembly 106. For example, a first position may correspond to the tunnel assembly 106 being configured for transport as shown in FIG. 1. A second position may correspond to the tunnel assembly 106 being configured for operation at a small tunnel size. A third position may correspond to the tunnel assembly 106 being configured for operation at a medium or intermediate tunnel size. A fourth position may correspond to the tunnel assembly 106 being configured for operation at a large or fully expanded tunnel size. Alternate embodiments may be directed to other quantities of tunnel sizes and may have more or less than four distinct operating positions.

In the embodiment shown in FIG. 4, the expandable base 300 has three subcomponents, a middle portion 320, the first end 314, and the second end 316. The middle portion 320 has a first cavity sized and shaped to receive the first end 314 and a second cavity sized and shaped to receive the second end 316. The first end 314 and the second end 316 are each slidably positioned within the first cavity and second cavity respectively. The middle portion 320 is fixed in position relative to the chassis 108 and the width 318 of the expandable base 300 is adjusted by sliding the first end 314 and the second end 316 into the first and second cavity.

In other embodiments, the expandable base 300 may be constructed differently. For example, the expandable base may have a first end with a cavity sized and shaped to receive a second end of the expandable base. In use, the width of the expandable base would be adjusted by sliding the second end into the cavity of the first end.

The central arch panel 302 is disposed above the expandable base 300. The central arch panel 302 is vertically adjustable relative to the expandable base 300 such that a height 322 of the central arch panel 302 is adjustable. The central arch panel 302 may have a continuous range of movement, or it may have discrete positions.

The first side panel 304 has a first side panel base 324 disposed at a lower end of the first side panel 304. The first side panel base 324 is coupled to the first end 314 of the expandable base 300. The coupling may be fixed such that motion of first side panel base 324 is fixed relative to the first end 314 of the expandable base 300, or in some embodiments the coupling may allow the first side panel base 324 to rotate relative to the first end 314.

The second side panel 306 may be a mirror image of the first side panel 304 and functions similarly to the first side panel 304 with the exception that a base 326 of the second side panel 306 is coupled to the second end 316 of the expandable base 300 rather than the first end 314. Like the first side panel 304, the second side panel 306 may be coupled to the expandable base 300 through a rigid coupling, or in other embodiments the coupling may be hinged.

The first intermediate panel 308 is disposed between the central arch panel 302 and the first side panel 304. A portion of an inner surface of the first side panel 304 faces a portion of an outer surface of the first intermediate panel 308. An upper end of the first intermediate panel 308 may be coupled to the central arch panel 302 through a hinged connection such that a lower end of the first intermediate panel 308 may swing outward when the expandable base 300 is expanded. The inner surface of the first side panel 304 constrains the lower end of the first intermediate panel 308 from swinging beyond the first side panel 304. The first intermediate panel 308 may be built of a flexible material allowing it to bend outward in response to the tunnel 110 filling with silage.

The second intermediate panel 310 may be a mirror image of the first intermediate panel 308 and functions in a like manner, with the exception that the first intermediate panel 308 is constrained by outward movement by an interior surface of the second side panel 306.

In operation the expandable base 300, first and second side panels 304, 306, first and second intermediate panel 308, 310, and central arch portion 302 form an inner surface of the tunnel 110. The tunnel 110 width is adjustable by expanding the expandable base 300. As the base 300 is expanded, the first and second intermediate panels 308 and 310 expand outward at their base to maintain the tunnel 110. When the central arch portion 302 is raised relative to the expandable base 300, the first and second intermediate panels 308 and 310 are free to move upward relative to the first and second side panes 304 and 306. The portion of the first and second intermediate panels 308 and 310 constrained by the first and second side panels 304 and 306 decreases as the central arch panel 302 raises. By adjusting the width of the expandable base 300 and the height of the central arch panel 302, the size of the tunnel 110 is adjustable.

The adjustable tunnel assembly 106 may have a predetermined number of operating positions for each of the components corresponding to operating conditions such as a specific bag size. For example, in transit, the adjustable tunnel assembly 106 may have a configuration in which the expandable base 300 is retracted to a width less than or equal to a total width of the bagging machine 100. The adjustable tunnel assembly 106 may be configured at a height the keeps it lower than the top of the bulkhead 118. The mobile bagging machine 100 may be transported with the adjustable tunnel assembly 106 at various heights depending upon any overhead obstructions.

The adjustable tunnel assembly 106 may have a configuration corresponding to a first bag size. In this configuration, the expandable base 300 is adjusted to a predetermined width according to the bag size and the height would be adjusted to a predetermined height corresponding to a bag size. In some embodiments the height of the adjustable tunnel assembly 106 is half the width of the adjustable tunnel assembly 106. For example, if a bag of nine feet in diameter is used, the adjustable tunnel assembly 106 may have a predetermined width of eleven feet and a height of five and a half feet. The adjustable tunnel assembly 106 may have other configurations corresponding to other bag sizes such as an eleven foot bag, and a fourteen foot bag. The eleven foot bag configuration may have a width of thirteen feet and a height of six and a half feet. The fourteen foot bag may have a width of seventeen feet and a height of eight and a half feet.

The expandable base 300 may be expanded by a variety of ways. For example, the base may be expanded manually, through a hydraulic actuator, electric actuator, or other means of producing movement. In some embodiments, the width of the expandable base 300 is controlled through the use of a graduated stop mechanism. The graduated stop mechanism constrains the width of the expandable base 300 to set increments. The increments generally correspond to the different configurations of the adjustable tunnel assembly 106. In some embodiments, the graduated stop mechanism includes a chain coupled to the chassis 108 at a first end and coupled to the expandable base 300 at the other end. The chain has a series of links marked to indicate the different configurations. In use, a marked link is used to adjust the length of the chain. The expandable base 300 is then expanded until the chain constrains any further outward movement by the expandable base 300. By choosing different marked links, an operator can adjust the width of the adjustable tunnel assembly 106.

The upper arch panel 302 may be self-actuated to rise up and down, or in some embodiments it may be rigidly coupled to a structure, such as arch panel base 142, which is actuated to move up and down. In the embodiment of FIGS. 1 through 4, the arch panel base 142 is actuated through the use of hydraulic cylinders 140. Expansion of the hydraulic cylinder 140 causes the arch panel base to move upward while retraction of the hydraulic cylinder 140 causes the arch panel base to move downward. The upper arch panel 302 may use a graduated stop mechanism similar to the graduated stop mechanism of the expandable base 300 to control the height of the adjustable tunnel assembly 106. In other embodiments, different graduated stops may be used such as limit switches or pins.

The graduated stop mechanism of the expandable base 300 and the graduated stop mechanism of the upper arch panel 302 may be interrelated to assist an operator in setting up the adjustable tunnel assembly 106 to a set configuration. For example, the links of the graduated stop mechanism of the expandable base 300 may be marked with colors corresponding to a specific bag size. The same color scheme may then be carried over the graduated stop for the adjustable tunnel assembly 106 height. Thus, for a specific bag size, an operator would only need to adjust each of the graduated stops to a common color rather than doing any measurements of the tunnel height and expandable base width.

The surface tensioning assembly 312 is disposed about the first and second side panels 304 and 306, the first and second intermediate panels 308 and 310, and the central arch panel 302. Because the intermediate panels 308 and 310 are flexible, they may bend outward when the tunnel 110 fills with silage. If the intermediate panels 308 and 310 were to bend outward sufficiently, they could overcome the constraint provided by the inner surface of the side panels 304 and 306 resulting in structural and containment failure of the adjustable tunnel assembly 106 or the bag tearing. The surface tensioning assembly 312 reinforces the integrity of the adjustable tunnel assembly 106 to prevent the various panels from excessive expansion.

The surface tensioning assembly 312 is an assembly configured to provide a tension along the outer surface of the adjustable tunnel assembly 106 from the first side panel 304 to the second side panel 306. In the embodiment of FIGS. 1 through 4, the surface tensioning assembly 312 includes at least one durable strap 400 coupled to the first side panel 304 at a first end and to the second side panel 306 at a second end. In other embodiments, the surface coupling assembly may be coupled to the expandable base 300 at the first and second ends.

Figure 5:
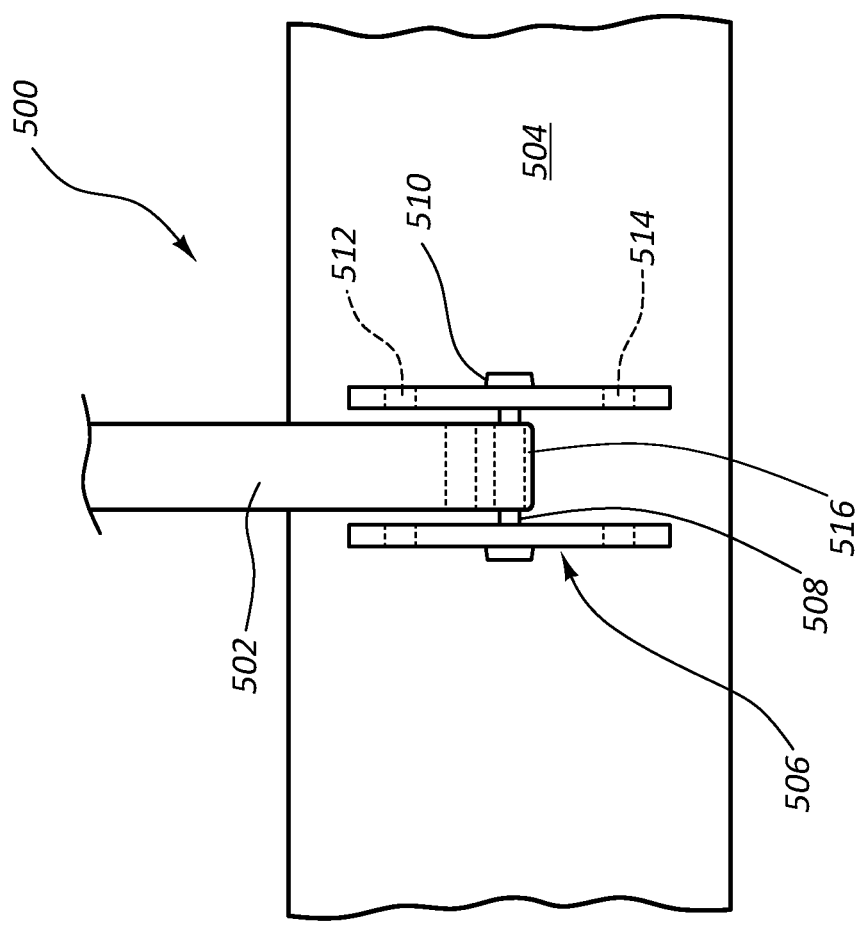
FIG. 5 illustrates a detailed view of an end of a surface tensioning assembly in some embodiments.

FIG. 5 illustrates a detailed view of an embodiment of a surface tensioning system 500. The surface tensioning system 500 includes at least one strap 502 coupled to a first side panel 504 at a first strap end. For clarity only one end of the strap is shown. The other end of the strap 502 may be identical to the first end. In some embodiments, a different strap size may be used to constrain each size of tunnel. In other embodiments, a single strap 502 may be used to constrain each of the different tunnel sizes.

Side panel 504 has a mount for connecting the strap 502. The mount may be a pin 508 having an axis parallel to an axis of the tunnel. In the embodiment of FIG. 5, a mounting block 506 having at least one bore 510 parallel to the axis of the tunnel secures the pin 508. In some embodiments, the mounting block may have a plurality of bores, such as bores 510, 512, and 514 corresponding to different tunnel configurations. The strap 502 may have a looped end 516 sized to fit over the pin 508. When the pin 508 is inserted through the looped end 516 and into the bore 510, the pin 508 secures the looped end 516 in place.

The bores may be disposed at fixed intervals as shown in FIG. 5. Each bore may correspond to a configuration of the tunnel. For example, bore 514 may correspond to a small configuration, bore 510 may correspond to an intermediate configuration, and bore 512 may correspond to an expanded configuration.

Figure 6:
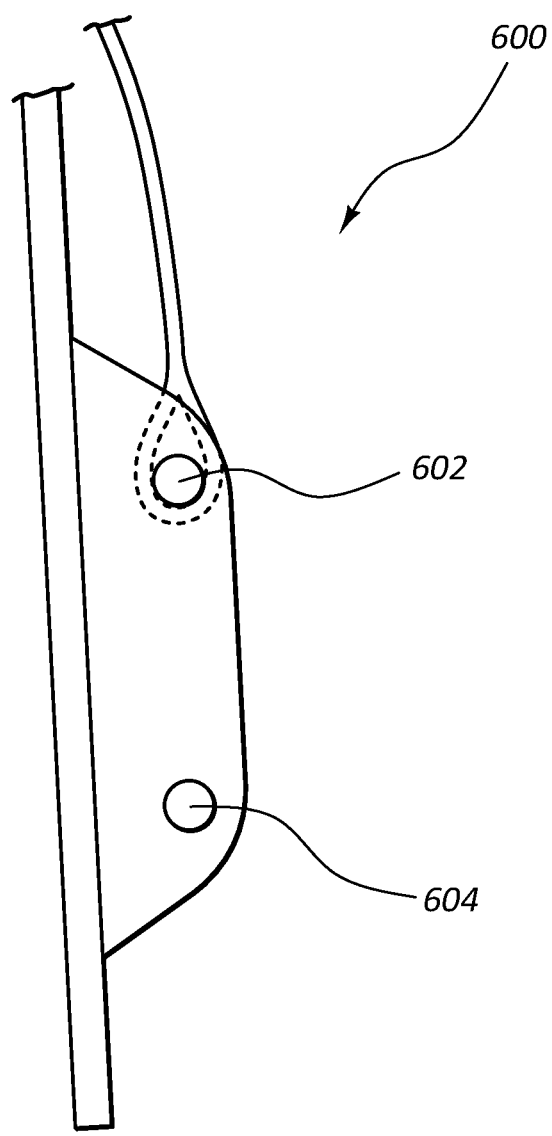
FIG. 6 illustrates a side view of an end of a surface tensioning assembly in some embodiments.

In some embodiments, a location may correspond to more than one configuration. FIG. 6 illustrates a side view of mounting block 600. In FIG. 6 there are two bores 602, 604, but three different configurations are possible.

Figure 7:
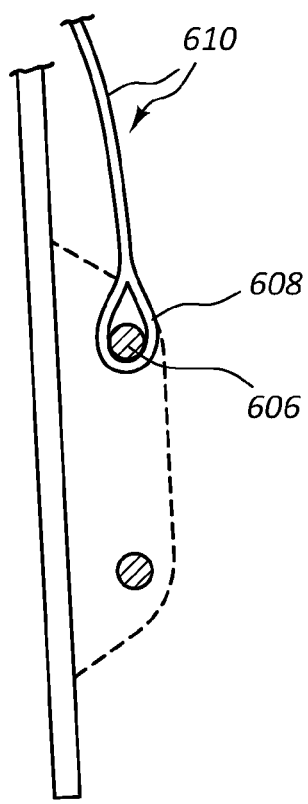
FIG. 7 illustrates a side view of the surface tensioning assembly of FIG. 6.

FIG. 7 illustrates a first configuration with a pin 606 mounted in the first bore 602. For clarity only the outline of the mounting block is shown in this figure. The strap 610 has a looped end 608 that is looped around pin 606. In this mounting location, the adjustable tunnel may be in a fully expanded configuration.

Figure 8:
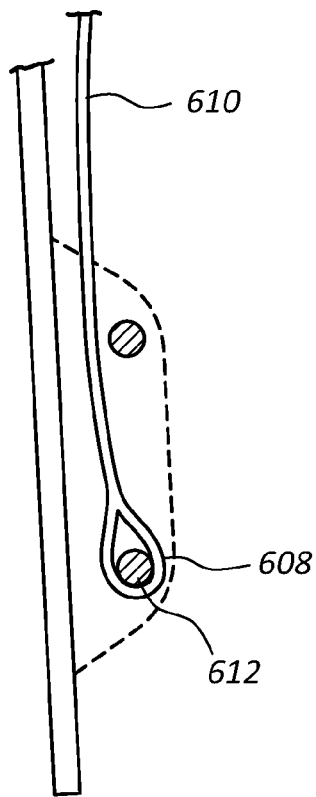
FIG. 8 illustrates a side view of the surface tensioning assembly of FIG. 6.

FIG. 8 illustrates a second configuration with a second pin 612 mounted in the second bore 604. The looped end 608 of the strap 610 is positioned over the second pin 612 securing strap 610. The strap 610 may pass under the first pin 606 before being looped around the second pin 612. In this mounting location the adjustable tunnel may be a partially expanded configuration.

Figure 9:
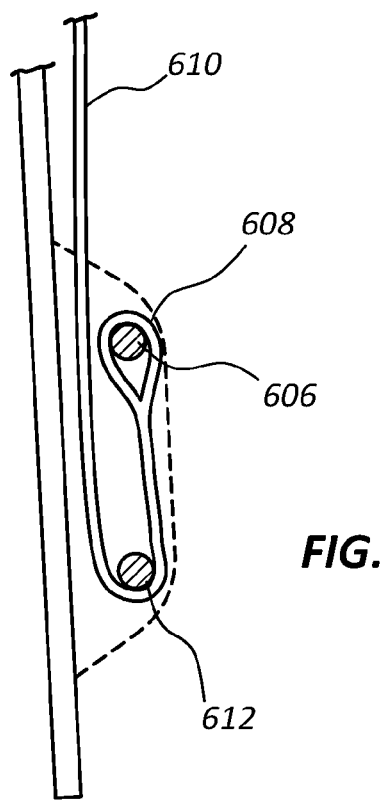
FIG. 9 illustrates a side view of the surface tensioning assembly of FIG. 6.

FIG. 9 illustrates a third configuration in which the adjustable tunnel is at reduced operating configuration compared to the configuration of FIGS. 7 and 8. In FIG. 9 the looped end 608 of the strap 610 is looped over the first pin 606 similar to the configuration of FIG. 7. However, the strap 610 additionally passes under the first pin 608 and loops around the second pin 612 before being secured to the first pin.

The mounts may be disposed equally on both sides of the adjustable tunnel assembly 106, or in some embodiments there may be a different number of mounts between the first and second side panels 304, 306. For example, the first side panel 304 may have a single mounting location for a first end of a strap 400, while the second side panel 306 may have multiple mounts for sizing the adjustable tunnel assembly 106. Having adjustable mounts on a single side of the adjustable tunnel assembly 106 allows for an operator to adjust the tunnel size from a single side of the bagging machine.

Together, the expandable base 300, the left and right side panels 304 and 306, first and second intermediate panels 306 and 308, and the central arch panel 302 define an inner surface of the tunnel 110 for receiving silage. As the silage moves into the tunnel 110, the silage presses against the tunnel's inner surface. The surface tensioning assembly 312 inhibits the tunnel 110 from expanding beyond a fixed size. If the tunnel 110 is initially smaller than the size associated with the surface tensioning assembly configuration, the tunnel 110 may expand until its size is constrained by the surface tensioning assembly 312.

Figure 2:
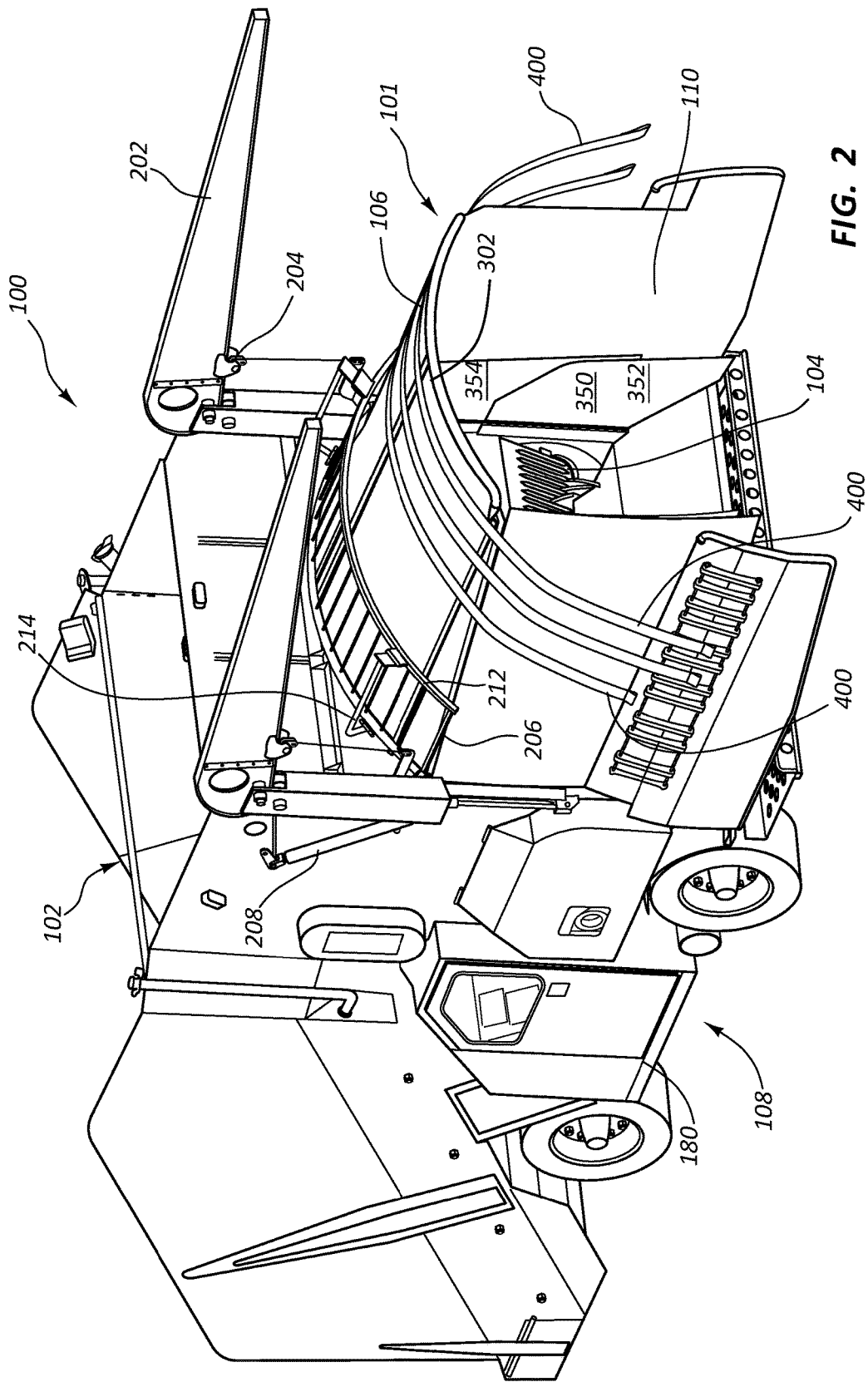
FIG. 2 illustrates the rear of the mobile bagging machine of FIG. 1.

Returning again to FIG. 1 through 4, as the tunnel 110 expands during use, a gap 348 may form between intermediate panels 310, and the bulkhead 118 as shown in FIG. 4. An end panel assembly 350 may be used to cover the gap 348 formed between the intermediate panel assemblies 310 and the bulkhead 118 as shown in FIG. 2. The end panel assembly 350 may be coupled to the bulkhead 118 at a first end of the end panel assembly 350, and uncoupled at an opposite end of the end panel assembly 350. As silage moves into the tunnel 110, the silage presses outward against the different panels. The force of the silage pressing on the end panel assembly 350 may deform the end panel assembly 350 and press it against the intermediate panel 310, which constrains the end panel assembly 350 from expanding further. The force of the silage may then hold the end panel assembly 350 in place.

The end panel assembly 350 may include a lower end panel 352 coupled to the bulkhead 118 and an upper end panel 354 coupled to the central arch panel 302. The lower end panel 352 and the upper end panel 354 may be vertically adjustable relative to one another. Thus, if the central arch panel 302 rises, the upper end panel 354 may raise relative to the lower end panel 352. If the central arch panel 302 lowers, the upper end panel 354 lowers relative to the lower end panel 352.

In one embodiment, the lower end panel 352 is coupled to the bulkhead 118 through a first vertical hinge 1000 (not shown) and the upper end panel 354 is coupled to the central arch panel 302 through a second vertical hinge 1002. The first hinge 1000 and the second hinge 1002 (not shown) have non-collinear axes, such that the upper end panel 354 and the lower end panel 352 may overlap.

The expandable base 300, central arch panel 302, and strap 400 may each have positions that when used together, correspond to various configurations of the adjustable tunnel assembly 106. For example, in a first configuration of the expandable tunnel assembly 106, the expandable base 300 may be positioned at a narrow position where the central arch panel 302 has a small height, and the strap 400 has a small length. This configuration may correspond to a particular tunnel size, such as an 8 foot tunnel. In a second configuration, the expandable base 300 may be at an intermediate width, the central arch panel 302 may be at an intermediate height, and the strap 400 may be at an intermediate length. This configuration may correspond to an 11 foot tunnel. In yet another configuration, the expandable base 300 may be expanded to a maximum width, the central arch panel 302 may be at a maximum height, and the strap 400 may be at a maximum length. Such a configuration may correspond to a 14 foot tunnel. The size of the tunnels is only given as an example, and various embodiments can take on a variety of heights and widths for desired spacing and dimensions.

The bagging machine may also include a bag hoisting assembly 200 configured to lift a portion of a bag over the central arch panel 302. In the embodiments of FIGS. 1 through 4, the bag hoisting assembly 200 includes a pair of rails 202, a pair of trollies 204, and a cradle 206. The rails 302 extend rearward from the bulkhead 118, and each rail 202 has a trolley 204 that runs along rail 202. Each trolley 204 is connected to an end of the cradle 206. As the trolleys 204 move along the rail 202, the cradle 206 moves along with them.

The rails 202 are configured to pivot about a pivot point 210 having a horizontal axis near the bulkhead 118. Their rotation may be effected by a mechanical actuator such as a hydraulic actuator 208, pneumatic actuator, or electric actuator. The pivot point 210 may be coupled to the central arch panel 302 such that vertical movement of the central arch panel 302 causes the pivot point 210 to move equidistant to and with the central arch panel 302.

With the rails 202 in an up or inclined position, the surface on which the trolleys 204 ride on is sloped downward towards the front of the mobile bagging machine 100. This is a typical position when the mobile bagging machine is being transported. The weight of the cradle 206 causes the trollies 204 to move toward the front end of the adjustable tunnel assembly 106.

When the rails 202 are in a down or decline position, the surface on which the trollies 204 ride on is sloped downward away from the front of the mobile bagging machine 100. The weight of the cradle 206 causes the trollies 204 to move toward the back of the mobile bagging machine 100. In this position the cradle 206 may hang below the upper arch panel 302. In order to prevent interference between the adjustable tunnel assembly 106 and the rails 202, the rails 202 may be angled outward, and the adjustable bagging assembly 106 may be angled inward. By angling the rails 202 and the adjustable tunnel assembly 106, the rails 202 may hang below the upper arch panel 302. When the rails 202 are angled downward, the downward end of the rail 202 extends past the end of the adjustable tunnel assembly 106.

The cradle 206 has an arched top to avoid interference with the central arch panel 302. At each end of the cradle 206 a bag arm 212 extends axially away from the cradle 206. Disposed above the bag arm 212, bag retainers 214 are disposed to secure a bag to the cradle 206. The bag retainers 214 may be biased to press downward against the bag arms 212. The bag retainers 214 may be elastically mounted such that they may be displaced upward but are biased to return to pressing against the bag arms 212. The cradle 206 has two connectors for connecting the cradle 206 to each of the trollies 204. The cradle 206 may connect directly to the trollies 204, or in other embodiments, like that of FIGS. 1 through 4, the cradle may connect to the trolleys through a cable 214.

To load a bag with the bag hoisting assembly 200, the rails 202 are first angled downward causing the trollies 204 to roll to the rear of the mobile bagging machine 100. The cradle 206 may be loaded onto the trollies 204 prior to angling the rail 202 downward, or it may be loaded with the trollies 204 in the down position.

With the cradle 206 in a lowered position a bag is placed about the cradle 206. The bag is typically mounted with several folds (i.e. bunched) over the cradle 206 such that the bag may be much longer than the bag arm 212. The bag retainer 214 fits over the bunched portion and secures the bag on the cradle 206. With an upper portion of the bag over the cradle 206, a lower portion of the bag may be placed below the expandable base 300. The sides of the bag may be placed on the outer surface of the side panels 304 and 306 and the intermediate panels 308 and 310, such that the bad surrounds a portion of the adjustable tunnel assembly 100. The rails 202 are then pivoted upward thereby lifting or hoisting the top of the bag. When the rails 202 are lifted past a horizontal point (level across opposite ends of the rails), then trolleys 204 slide back towards the front of the mobile bagging machine 100. The cradle 206 will move towards the front of the mobile bagging machine 100 until it reaches the end of the rail 202, or until the bag hangs up on the adjustable tunnel assembly 106. If the bag hangs up on the adjustable tunnel assembly 106, the rails 204 are rotated downward again to release the bag from where it hung up on the adjustable tunnel assembly 106. The lower portion of the bag and the sides of the bag may then be manually pulled toward the front of the mobile bagging machine 100. If the rails 202 still slope downward toward the front of the mobile bagging machine 100, as the bottom and sides of the bag are moved over the bottom of the tunnel, the top of the bag will slide forward as well. If the rail 202 has been rotated far enough that the rails slope downward away from the front of the mobile bagging machine 100, and then the rails 202 may be rotated again until they slope downward towards the mobile bagging machine 100. This process is repeated until a sufficient amount of the bag has been fitted around the adjustable tunnel assembly 106.

The bag is typically loaded onto the cradle 206 with the expendable base 300 retracted. This allows the rails 202 to rotate downward along the side of the adjustable tunnel assembly 106. Once the bag is in place, the expandable base 300 is expanded to a width corresponding to the bag size and the central arch panel 302 is raised to the height corresponding to the bag size. The bag is then ready to be packed with silage or other fill material.

The adjustable tunnel assembly may be used with loading systems other than the described hoisting system and may be used independent of any loading system. For example, in one embodiment the bag hoisting system may be replaced by a conventional loading system with a hoist on a single beam disposed above the bagging tunnel. The hoist is slidable along the beam such that it may be moved from proximate the bulkhead 118 to beyond the adjustable tunnel assembly 106. The hoist lowers a bag loader onto which a portion of a bag is loaded. The hoist then retracts the bag loader lifting a portion of the bag higher than the central arch panel 302. The hoist is then slid along the rail towards the bulkhead 118, with the bag enveloping the adjustable tunnel assembly 106.

In another aspect, methods of loading a bag onto a bagging machine are disclosed. In the method, a cylindrical bag is first obtained. The cylindrical bag may be bunched such that an extended length of the bag may be reduced to a length less than a length of a central arch panel. A mobile bagging machine comprising a tunnel having an inlet and an outlet, at least one rail extending from a first end proximate the inlet to a second end proximate the outlet, the at least one rail being rotatable about the first end, and a cross-member configured to slide along the at least one rail is then accessed. A mouth of the cylindrical bag is then expanded. The second end of a rail is lowered relative to the first end of the rail causing the slidable cross member to slide toward the second rail end. The second end of the rail may be lowered by angling the rails at a downward angle away from the first end of the rail. The rail may pivot about a horizontal axis proximate the second end of rail. A top of the mouth of the cylindrical bag is then fitted over a portion of the slidable cross member. The cylindrical bag is secured to the top of the slidable cross member. The second end of the rail is then raised above the first end of the rail causing the slidable cross member to slide toward the first end of the rail pulling the cylindrical bag along with the slidable cross member. The bottom of the mouth of the cylindrical bag is then advanced toward the first end of the rail.

In some embodiments the rails may be raised and lowered by moving the axis of rotation of the rails proximate the first end. During bag loading the axis may be lowered to a height less than a top of the tunnel with the rails on each side of the tunnel. The rails may then be lowered until the cross-member is proximate the ground and the mouth of the bag may be loaded onto the cross member. Then the axis may be raised in addition to angling the rails to lift the bag.

Figure 10:
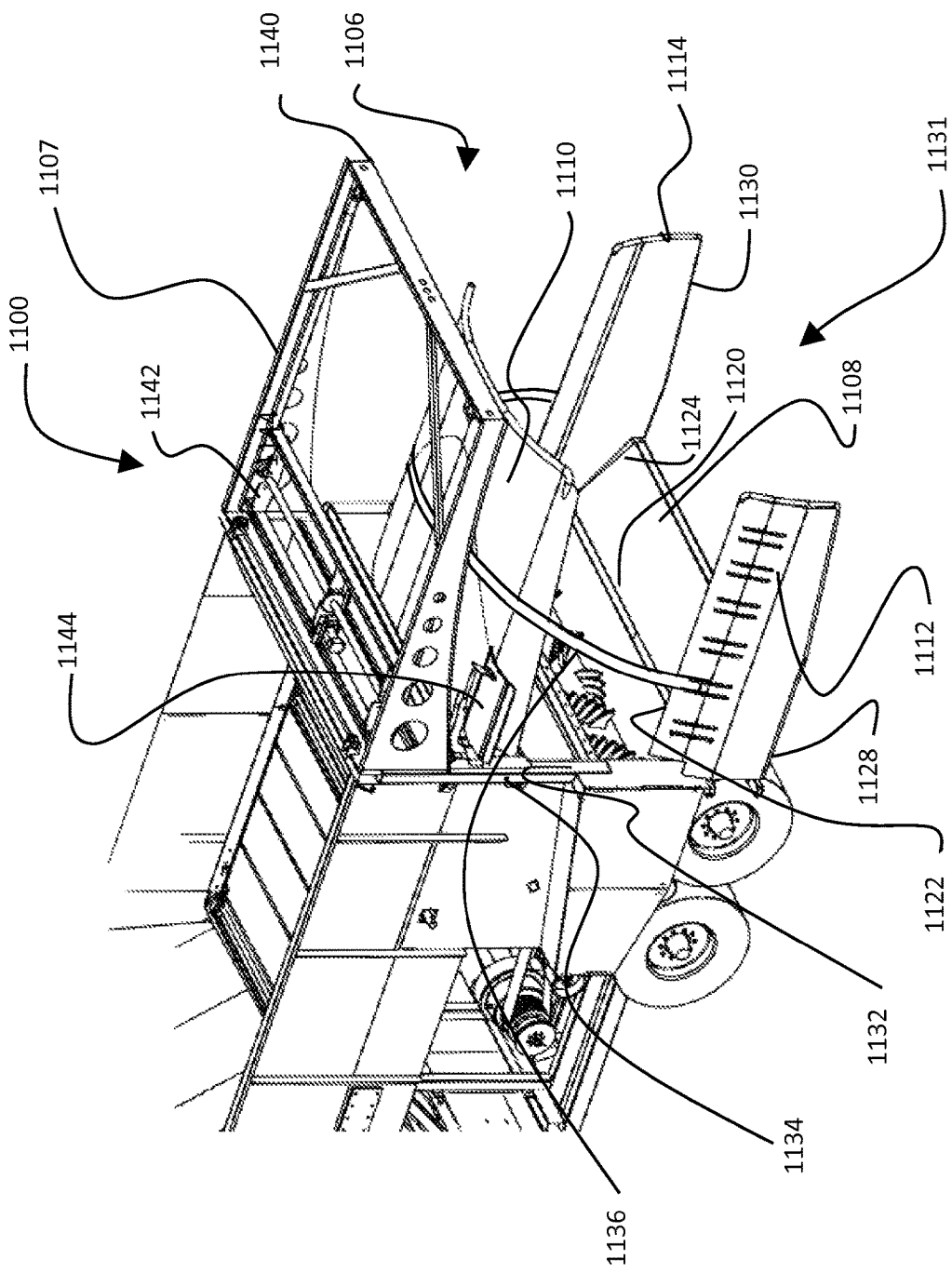
FIG. 10 illustrates a rear view of another embodiment of a mobile bagging machine.
Figure 11:
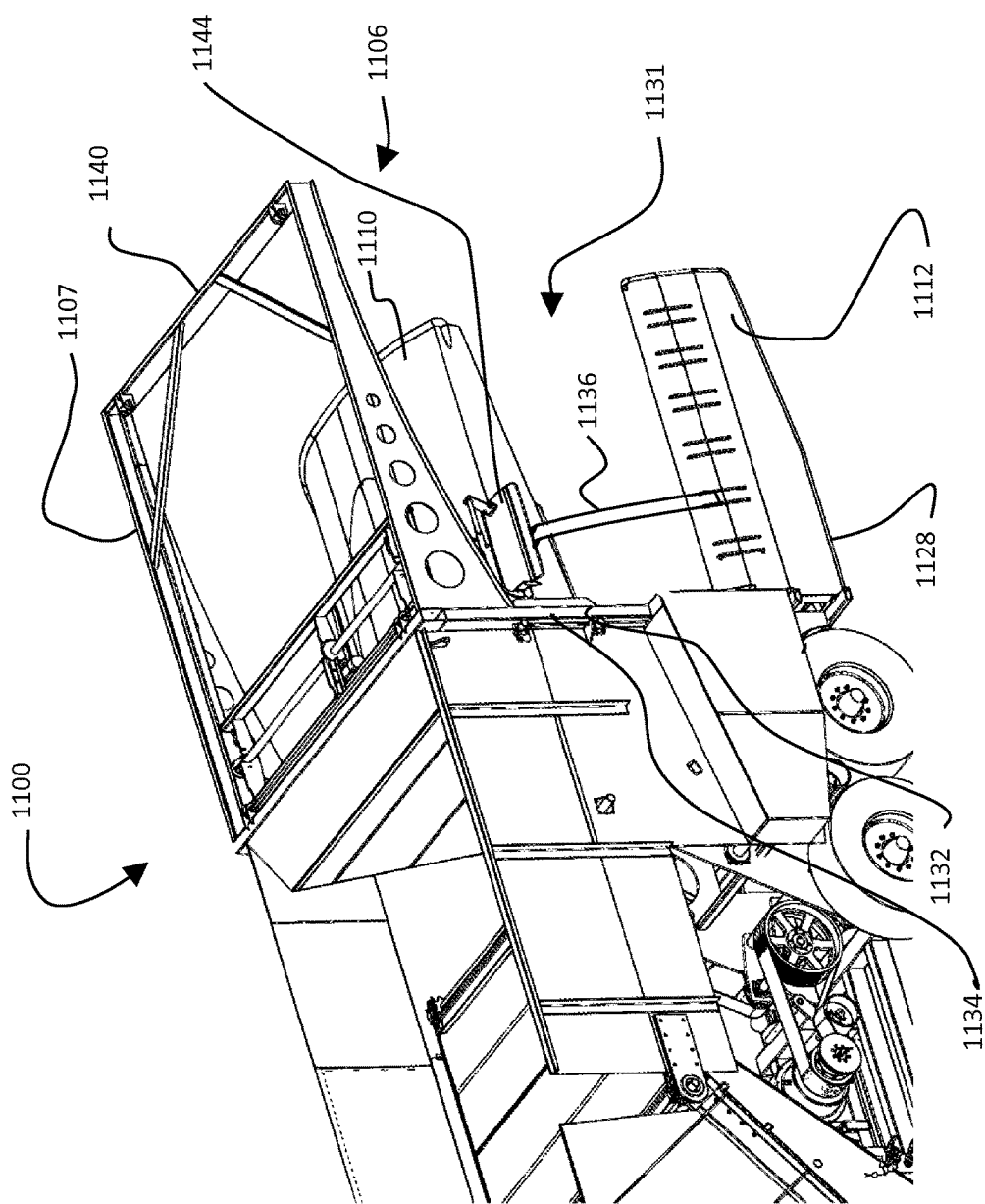
FIG. 11 illustrates another view of the embodiment of the mobile bagging machine of FIG. 10.

FIGS. 10 and 11 illustrate another embodiment of a mobile bagging machine 1100. The mobile bagging machine 1100 is similar to the mobile bagging machine 100 of FIG. 1, and like parts will not be described in further detail. Mobile bagging machine 1100 differs from mobile bagging machine 100 of FIG. 1 generally from the bulkhead 118 rearward. To the rear of the mobile bagging machine 1100 is a tunnel assembly 1106 and a bag hoisting assembly 1108.

Tunnel assembly 1106 is similar to tunnel assembly 106, differing mainly in size and number of configurations. The tunnel assembly 1106 has an expandable base 1108, a central arch panel 1110, a first side panel 1112, a second side panel 1114, a first intermediate panel (not shown for clarity), a second intermediate panel 1118 (not shown for clarity), and a surface tensioning assembly 1120.

The expandable base 1108 has a first end 1122 and a second end 1124. The first end 1122 and the second end 1124 are movable relative to one another such that a distance between the first end 1122 and the second end 1124 is variable. When the first end 1122 and the second end 1124 are at a minimum distance apart they are in a collapsed configuration suitable for transport, as shown in FIG. 10. In use, the first end 1122 and the second end 1124 are at a greater distance apart for fitment to a bag size larger than the collapsed configuration. The expandable base 1108 may be adjustable to have configurations other than the collapsed configuration, such that multiple widths are possible.

In the embodiment of FIGS. 10 and 11, the expandable base 1108 has three distinct configurations. The three distinct operating configurations correspond to different configurations of the tunnel assembly 1106. For example, a first position may correspond to the tunnel assembly 1106 being configured for transport as shown in FIG. 10. A second position may correspond to the tunnel assembly 1106 being configured for operation at a small tunnel size and the third position may correspond to the tunnel assembly 1106 being configured for operation at a large tunnel. Alternate embodiments may be directed to other quantities of tunnel sizes and may have more or less than three distinct operating positions.

The expandable base 1108 may have three subcomponents, a middle portion, a first end, and a second end. The middle portion may have a cavity sized and shaped to receive the first end and the second end. The first end and the second end may each be slidably positioned within the cavity. The middle portion may be fixed in position relative to the chassis and the width of the expandable base is adjusted by sliding the first end and the second end into the first and second cavity.

The central arch panel 1110 is disposed above the expandable base 1106 and is vertically adjustable relative to the expandable base 1106 such that a height of the central arch panel 1110 is adjustable. The central arch panel 1110 may have a continuous range of movement, or it may have discrete positions.

The first side panel 1112 has a first side panel base 1128 disposed at a lower end of the first side panel 1112. The first side panel base 1128 is coupled to the first end of the expandable base 1108. The coupling may be fixed such that motion of first side panel base 1128 is fixed relative to the first end of the expandable base 1108, or in some embodiments the coupling may allow the first side panel base 1128 to rotate relative to the first end of the expandable base.

The second side panel 1114 may be a mirror image of the first side panel 1112 and functions similarly to the first side panel 1112 with the exception that a base 1130 of the second side panel 1114 is coupled to the second end of the expandable base 1108 rather than the first end. Like the first side panel 1112, the second side panel 1114 may be coupled to the expandable base 1108 through a rigid coupling, or in other embodiments the coupling may be hinged.

The first intermediate panel is disposed between the central arch panel 1110 and the first side panel 1112. A portion of an inner surface of the first side panel 1112 faces a portion of an outer surface of the first intermediate panel. An upper end of the first intermediate panel may be coupled to the central arch panel 1112 through a hinged connection such that a lower end of the first intermediate panel may swing outward when the expandable base 1108 is expanded. The inner surface of the first side panel 1112 constrains the lower end of the first intermediate panel from swinging beyond the first side panel 1112. The first intermediate panel may be built of a flexible material allowing it to bend outward in response to the tunnel 1110 filling with silage.

The second intermediate panel may be a mirror image of the first intermediate panel and functions in a like manner, with the exception that the first intermediate panel is constrained by outward movement by an interior surface of the second side panel 1114.

In operation the expandable base 1108, first and second side panels 1112, 1114, first and second intermediate panel, and central arch portion 1110 form an inner surface of a tunnel 1131. The tunnel 1131 width is adjustable by expanding the expandable base 1108. As the base 1108 is expanded, the first and second intermediate panels expand outward at their base to maintain the tunnel 1131. When the central arch portion 1110 is raised relative to the expandable base 1108, the first and second intermediate panels are free to move upward relative to the first and second side panels 1112 and 1114. The portion of the first and second intermediate panels constrained by the first and second side panels 1112 and 1114 decreases as the central arch panel 1110 raises. By adjusting the width of the expandable base 1108 and the height of the central arch panel 1110, the size of the tunnel 1131 is adjustable.

The adjustable tunnel assembly 1106 may have a predetermined number of operating positions for each of the components corresponding to operating conditions such as a specific bag size. For example, in transit, the adjustable tunnel assembly 1106 may have a configuration in which the expandable base 1108 is retracted to a width less than or equal to a total width of the bagging machine 1100. The adjustable tunnel assembly 1106 may be configured at a height the keeps it lower than the top of the bulkhead.

The adjustable tunnel assembly 1106 may have a small configuration corresponding to a smaller bag size. In this configuration, the expandable base 1108 is adjusted to a predetermined width according to the bag size and the height would be adjusted to a predetermined height corresponding to the bag size. In some embodiments the height of the adjustable tunnel assembly 1106 is half the width of the adjustable tunnel assembly 1106. For example, if a bag of twelve feet in diameter is used, the adjustable tunnel assembly 1106 may have a predetermined width of twelve feet and a height of six feet. The adjustable tunnel assembly 1106 may have other configurations corresponding to other bag sizes such as a fourteen foot bag. The fourteen foot bag may have a width of seventeen feet and a height of eight and a half feet.

The width of the expandable base 1108 may be controlled through the use of a graduated stop mechanism. The graduated stop mechanism constrains the width of the expandable base 1108 to set increments corresponding to the different configurations of the adjustable tunnel assembly 1106. In some embodiments, the graduated stop mechanism includes a chain coupled to the chassis at a first end and coupled to the expandable base 1108 at the other end. The chain has a series of links marked to indicate the different configurations. In use, a marked link is used to adjust the length of the chain. The expandable base 1108 is then expanded until the chain constrains any further outward movement by the expandable base 1108. By choosing different marked links, an operator can adjust the width of the adjustable tunnel assembly 1106.

The upper arch panel 1110 may be self-actuated to rise up and down, or in some embodiments it may be rigidly coupled to a structure, such as central arch panel base 1132, which is actuated to move up and down. The central arch panel base 1132 may be mounted to the bulkhead by way of mounting slides 1134 disposed external to the tunnel 1131. Having the mounting slides 1134 external to the tunnel inhibits material within the tunnel from filling in the mounting slides. The upper arch panel 1110 may use a graduated stop mechanism similar to the graduated stop mechanism of the expandable base 1108 to control the height of the adjustable tunnel assembly 1106. In other embodiments, different graduated stops may be used such as limit switches or pins.

The graduated stop mechanism of the expandable base 1108 and the graduated stop mechanism of the upper arch panel 1110 may be interrelated to assist an operator in setting up the adjustable tunnel assembly 1106 to a set configuration. For example, the links of the graduated stop mechanism of the expandable base 1108 may be marked with colors corresponding to a specific bag size. The same color scheme may then be carried over the graduated stop for the adjustable tunnel assembly 1106 height. Thus, for a specific bag size, an operator would only need to adjust each of the graduated stops to a common color rather than doing any measurements of the tunnel height and expandable base width.

The surface tensioning assembly 1120 is disposed about the first and second side panels 1112 and 1114, the first and second intermediate panels, and the central arch panel 1110. Because the intermediate panels are flexible, they may bend outward when the tunnel 110 fills with silage. If the intermediate panels were to bend outward sufficiently, they could overcome the constraint provided by the inner surface of the side panels resulting in structural and containment failure of the adjustable tunnel assembly 1106 or the bag tearing. The surface tensioning assembly 1120 reinforces the integrity of the adjustable tunnel assembly 1106 to prevent the various panels from excessive expansion.

The surface tensioning assembly 1120 is an assembly configured to provide a tension along the outer surface of the adjustable tunnel assembly 1106 from the first side panel 1112 to the second side panel 1114. In the embodiment of FIG. 11, the surface tensioning assembly 1120 includes at least one durable strap 1136 coupled to the first side panel 1112 at a first end and to the second side panel 1114 at a second end. In other embodiments, the surface tensioning assembly 1120 may be coupled to the expandable base 1108 at the first and second ends.

The surface tensioning assembly 500 of FIG. 5 is suitable for use for the adjustable tunnel of FIG. 11. However, because the tunnel assembly of FIG. 11 has only 2 configurations, only two bores for receiving the pin 508 are necessary.

The surface tensioning assembly 600 of FIG. 6 may similarly be suitable for use in the embodiment of FIG. 11, but may use only the two strap configurations shown in FIGS. 7 and 9.

The bagging machine 1100 includes a bag hoisting assembly 1107 configured to lift a portion of a bag over the central arch panel 1110. The bag hoisting assembly 1107 includes a frame 1140 and a trolley 1142 configured to move from a forward end of the trolley to a rearward end of the trolley 1142. The trolley may be moveable by a power source such as a rack and pinion, hydraulic cylinder, or pulley connection. The frame 1140 is disposed over the tunnel assembly 1106 and extends from the bulkhead to beyond the tunnel assembly 1106 such that the trolley 1142 may be extended past the tunnel assembly 1106. At least one spoon 1144 is suspended from the trolley 1142 and configured to move vertically such that it can be lowered and raised from the trolley 1142. The spoons 1144 may be suspended by cable or rope and have a hoist attachment to the trolley 1142. In other embodiments the spoons 1144 may be suspended from the trolley 1142 by other mechanisms such as a retractable arm or pivoting beam.

The frame 1140 may have a width the same as the width of the mobile bagging machine 1100, or in some embodiments, it may be slightly narrower or slightly wider than the chassis. The embodiment of FIG. 11 has two spoons 1142, (although only one spoon is illustrated) near the sides of the frame to lift the bag at the sides. In some embodiments, the bag may have a third spoon near the center of the trolley 1142 to reduce sagging of the bag.

In use, a bag may be loaded onto the tunnel assembly 1106 by moving the trolley 1142 to the rear of the tunnel assembly 1142 away from the bulkhead and lowering the spoons 1144. The bag is then fed over the spoons 1142. The spoons 1142 are raised, opening the bag and lifting it higher than the central arch panel 1110. The trolley 1142 may then be moved forward, moving the spoons 1144 and the bag over the central arch panel 1110. The spoons 1144 may then be lowered until the inner surface of the bag is resting on the top of the central arch panel 1110. The surface tensioning assembly 1120 may then be set to a configuration corresponding to the bag size and the expandable tunnel assembly 1106 expanded into the configuration according to the bag size. In some embodiments, the surface tensioning assembly 1120 may be placed over the bag to help secure the bag to the tunnel assembly 1106. In other embodiments, the surface tensioning assembly 1120 may be disposed under the bag.

The mobile bagging machine 1100 may be moved while the bag is positioned over the expandable tunnel assembly 1106. Because the expandable tunnel assembly 1106 may extend beyond the sides of the mobile bagging machine, it may be necessary to retract the expandable base 1108 to transport the mobile bagging machine 1100. As the expandable base 1108 retracts, the bag may sag, contacting the ground. To lift the bag so it does not contact the ground, the spoons 1144 may be raised until the bag is lifted off the ground. Upon reaching its destination, the expandable base 1108 may be extended again and the spoons 1144 lowered until the bag is resting on the central arch panel 1110 again.

The invention claimed is:

1. An adjustable tunnel of a mobile bagging machine, the tunnel comprising:
    an expandable base having first and second ends, the expandable base having collapsed and expanded configurations, wherein a distance between the first end and the second end is less in the collapsed configuration than in the expanded configuration;
    a central arch panel disposed above the expandable base, wherein the central arch panel is vertically and continuously movable between first and second positions;
    a first side panel having a first side panel base coupled to the expandable base at the first end;
    a second side panel having a second side panel base coupled to the expandable base at the second end;
    a first intermediate panel disposed between the central arch panel and the first side panel;
    a second intermediate panel disposed between the central arch panel and the second panel; and
    a surface tensioning assembly disposed about the first and second side panels, the first and second intermediate panel, and the central arch panel,
    an end panel assembly comprising a lower end panel coupled to a bulkhead and an upper end panel connected to the central arch panel, wherein the lower end panel and the upper end panel are vertically movable relative to one another, wherein a height of the central arch panel varies between the first and second configurations.

2. The adjustable tunnel of claim 1, wherein the lower end panel couples to the lower portion of the expandable inlet through a first vertical hinge and the upper end panel couples to the upper portion of the expandable inlet through a second vertical hinge, wherein the first vertical hinge and the second vertical hinge have non-collinear axes.

3. The adjustable tunnel of claim 1, wherein the surface tensioning system comprises at least one strap coupled to the first side panel at a first strap end and to the second side panel at a second strap end.

4. The adjustable tunnel of claim 3, wherein the strap has a fixed length and each side panel has a plurality of mounts.

5. The adjustable tunnel of claim 4, wherein the plurality of mounts are spaced apart at a fixed interval.

6. The adjustable tunnel of claim 5, wherein the strap has a looped end and each of the mounts comprises a pin.

7. The adjustable tunnel of claim 6, wherein the plurality of mounting positions consists of two pins.

8. The adjustable tunnel of claim 7, wherein the strap selectively mounts in at least three configurations consisting of the loop about the first pin, the strap under the first pin and the loop about the second pin, and the strap under the first pin, the strap looping around the second pin, and the loop about the first pin.

9. The adjustable tunnel of claim 7 wherein the strap selectively mounts in at least two configurations consisting of the loop about the first pin and the strap under the first pin and the loop about the second pin.

10. The adjustable tunnel of claim 5, further comprising a graduated stop mechanism having a plurality of discrete positions for the height of the expandable inlet.

11. The adjustable tunnel of claim 10, where the number of plurality of mounting positions of the strap, the number of the plurality of the discrete stop position, and the number of the discrete positions of the height are each equal in quantity to one another.

12. The adjustable tunnel of claim 9, wherein the number of plurality of mounting positions of the strap is two, the number of the plurality of the discrete stop positions is two, and the number of the discrete positions of the height is two.

13. The adjustable tunnel of claim 1, further comprising a bag hoisting assembly configured to lift a portion of a bag over the central arch panel.

14. The adjustable tunnel of claim 13, wherein the bag hoisting assembly comprises a frame disposed over the central arch panel and a longitudinally movable hoist coupled to a beam.

15. The adjustable tunnel of claim 13, wherein the bag hoisting assembly comprises a pair of rails disposed above the expandable base, the pair of rails having an axis of rotation about a base end of the beam and a trolley assembly configured to translate along the pair of rails.

16. The adjustable tunnel of claim 15, wherein the pair of rails extend rearward from the bulkhead and are configured to pivot about a pivot point.

17. The adjustable tunnel of claim 13, further comprising (i) a cradle having a first beam proximate the first side panel and a second beam proximate the second side panel, (ii) a trolley assembly having a first trolley disposed on the first beam and a second trolley disposed on the second beam wherein the cradle is coupled to the first and second trolleys.

* * * * *